United States Patent
Guo et al.

(10) Patent No.: US 9,351,208 B2
(45) Date of Patent: May 24, 2016

(54) MULTI-SITE CELL COMMUNICATION METHOD, BASE STATION CONTROLLER, BASE STATION, AND COMMUNICATION SYSTEM THEREOF

(71) Applicant: Huawei Technologies Co., Ltd., Shenzhen, Guangdong (CN)

(72) Inventors: Jiang Guo, Shanghai (CN); Jingjin Mei, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 14/273,855

(22) Filed: May 9, 2014

(65) Prior Publication Data

US 2014/0248879 A1    Sep. 4, 2014

Related U.S. Application Data

(63) Continuation of application No. PCT/CN2012/084370, filed on Nov. 9, 2012.

(30) Foreign Application Priority Data

Nov. 9, 2011    (CN) .......................... 2011 1 0352483

(51) Int. Cl.
*H04W 36/30* (2009.01)
*H04W 36/18* (2009.01)
(Continued)

(52) U.S. Cl.
CPC .............. *H04W 36/06* (2013.01); *H04W 36/16* (2013.01); *H04W 48/10* (2013.01)

(58) Field of Classification Search
CPC ..... H04W 36/30; H04W 36/18; H04W 36/14; H04W 36/12; H04W 36/0083; H04W 28/16; H04W 16/24; H04W 16/14; H04W 72/082; H04W 28/04
See application file for complete search history.

(56) References Cited

U.S. PATENT DOCUMENTS 6,141,566 A    10/2000  Gerdisch et al.
6,310,871 B1   10/2001  Kim
(Continued)

FOREIGN PATENT DOCUMENTS

CN    101448306 A    6/2009
CN    101553030 A    10/2009
(Continued)

OTHER PUBLICATIONS

Christophorou et al., "An Enhanced Approach for Efficient MBMS Handovers in 3G Networks," IEEE Symposium on Computers and Communications 2008, pp. 362-367, Institute of Electrical and Electronics Engineers, New York, New York (Jul. 6-9, 2008).
(Continued)

Primary Examiner — Sharad Rampuria
Assistant Examiner — Obidon Bassinan
(74) Attorney, Agent, or Firm — Leydig, Voit & Mayer, Ltd.

(57) ABSTRACT

The present invention relates to the field of communications technologies and discloses a multi-site cell communication method, a base station controller, a base station, and a communication system thereof to increase cell capacity of a base station based on a multi-site cell technology. A multi-site cell communication method includes: when the terminals that respectively access different subsites occupy different logical channels, handing over terminals, which access different subsites respectively, to a same logical channel. A multi-site cell communication method includes: using a same logical channel to modulate and send downlink data to terminals that access different subsites respectively; and/or receiving and demodulating uplink data that is sent through the same logical channel by the terminals that access different subsites respectively.

12 Claims, 3 Drawing Sheets

(51) Int. Cl.
*H04W 36/14* (2009.01)
*H04W 36/08* (2009.01)
*H04W 36/06* (2009.01)
*H04W 36/16* (2009.01)
*H04W 48/10* (2009.01)

(56) References Cited

U.S. PATENT DOCUMENTS

| | | | | |
|---|---|---|---|---|
| 6,807,422 | B1* | 10/2004 | Ekman | H04W 36/02 370/331 |
| 6,985,736 | B1* | 1/2006 | Aalto | H04W 36/20 455/444 |
| 2006/0003784 | A1 | 1/2006 | Chion et al. | |
| 2009/0028112 | A1* | 1/2009 | Attar | H04W 36/30 370/332 |
| 2010/0008295 | A1* | 1/2010 | Ji | H04W 48/20 370/328 |
| 2010/0087197 | A1* | 4/2010 | Iwamura | H04J 11/0086 455/436 |
| 2010/0197314 | A1 | 8/2010 | Maaref et al. | |
| 2011/0039551 | A1* | 2/2011 | Tsuboi | H04W 48/20 455/424 |
| 2011/0317577 | A1* | 12/2011 | Yamada | H04W 24/10 370/252 |
| 2012/0202556 | A1* | 8/2012 | Mori | H04W 36/30 455/525 |

FOREIGN PATENT DOCUMENTS

| | | |
|---|---|---|
| CN | 102204336 A | 9/2011 |
| CN | 102413524 A | 4/2012 |

OTHER PUBLICATIONS

"Some influences on MAC Layer on Account of Four Key Features of TD-SCDMA," TSG-RAN Working Group 2 (L2/L3) Meeting #6, France, TSGR2#6(99)783, 3$^{rd}$ Generation Partnership Project, Valbonne, France (Aug. 15-20, 1999).

* cited by examiner

MULTI-SITE CELL COMMUNICATION METHOD, BASE STATION CONTROLLER, BASE STATION, AND COMMUNICATION SYSTEM THEREOF

CROSS-REFERENCE TO RELATED APPLICATIONS

This application is a continuation of International Patent Application No. PCT/CN2012/084370, filed on Nov. 9, 2012, which claims priority to Chinese Patent Application No. 201110352483.8, filed on Nov. 9, 2011, both of which are hereby incorporated by reference in their entireties.

FIELD OF THE INVENTION

The present invention relates to the field of communications technologies, and in particular, to a multi-site cell communication method, a base station controller, a base station, and a communication system thereof.

BACKGROUND OF THE INVENTION

Multiple physical cells under a base station are called subsites (Subsite), which belong to different physical addresses respectively, but logically belong to the same cell. Every subsite has the same cell-level parameter configurations such as the number of carriers, frequencies, and channels. A multi-site cell technology refers to combining multiple subsites into one cell to reduce user handovers, reduce the number of frequencies used by the entire cell, and use fewer frequencies to cover a wider area. The multi-site cell technology is especially applicable to a scenario where the user quantity to be covered is definite but the traffic is moving, for example, high-speed rails, buildings, tunnels, bridges, and stadiums.

As the multi-site cell technology is widely applied, its feature of saving frequencies of users is increasingly valued. However, in the process of implementing the present invention, the inventor finds at least the following problems in using the multi-site cell technology:

Because fewer frequencies are used, for example, after three subsites under a base station combine into one cell, the number of used logical channels decreases to ⅓ of an original number, the terminals in different subsites occupy different logical channels. Once a logical channel is occupied, the logical channel is unavailable to terminals in all other subsites under the entire cell, which reduces capacity of the entire cell.

SUMMARY OF THE INVENTION

Embodiments of the present invention provide a multi-site cell communication method, a base station controller, a base station, and a communication system thereof to increase cell capacity of a base station based on a multi-site cell technology.

To solve the above technical problem, the embodiments of the present invention adopt the following technical solutions:

A multi-site cell communication method includes:
handing over terminals, which access different subsites respectively, to a same logical channel when the terminals, which access different subsites respectively, occupy different logical channels.

A multi-site cell communication method includes:
using a same logical channel to modulate and send downlink data to terminals that respectively access different subsites; and/or receiving and demodulating uplink data that is sent through the same logical channel by the terminals that access different subsites respectively.

A base station controller for implementing a multi-site cell includes:
a handover apparatus, configured to hand over terminals, which access different subsites respectively to a same logical channel, when the terminals, which access different subsites respectively, occupy different logical channels.

A base station for implementing a multi-site cell includes:
a transceiver apparatus, configured to use a same logical channel to modulate and send downlink data to terminals that access different subsites respectively, and/or receive and demodulate uplink data that is sent through the same logical channel by the terminals that access different subsites respectively.

A communication system for implementing a multi-site cell includes the foregoing base station controller and/or the base station and/or the terminal.

With the multi-site cell communication method, the base station controller, the base station, and the communication system thereof provided in the embodiments of the present invention, the terminals that access different subsites use the same logical channel, thereby reducing occupation of logical channels and increasing cell capacity of a base station based on a multi-site cell technology.

BRIEF DESCRIPTION OF THE DRAWINGS

To describe the technical solutions in the embodiments of the present invention or in the prior art more clearly, the following briefly introduces the accompanying drawings needed for describing the embodiments. Apparently, the accompanying drawings in the following descriptions show merely some embodiments of the present invention, and persons of ordinary skill in the art may still derive other drawings from the accompanying drawings without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Embodiment 1

Figure 1:
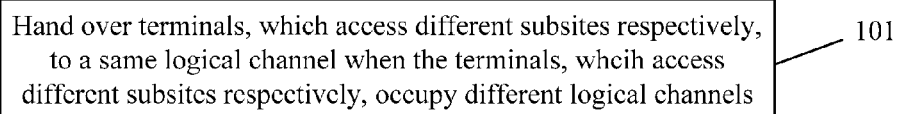
FIG. 1 is a flowchart of a communication method for a multi-site cell base station controller according to Embodiment 1 of the present invention.

The embodiment provides a communication method for a multi-site cell base station controller. As shown in FIG. 1, the method specifically includes:

Step 101: Hand over terminals, which access different subsites respectively, to a same logical channel when the terminals, which access different subsites respectively, occupy different logical channels.

In the entire cell of a base station based on a multi-site cell technology, once a logical channel is occupied, the logical channel is unavailable to all terminals in other subsites under the entire cell. By handing over the terminals in different subsites to the same logical channel, logical channels may be saved and available to other terminals. Compared with the prior art in which the terminals accessing different subsites occupy different logical channels, the embodiment reduces occupation of logical channels and increases cell capacity of a base station based on a multi-site cell technology.

Embodiment 2

Figure 2:
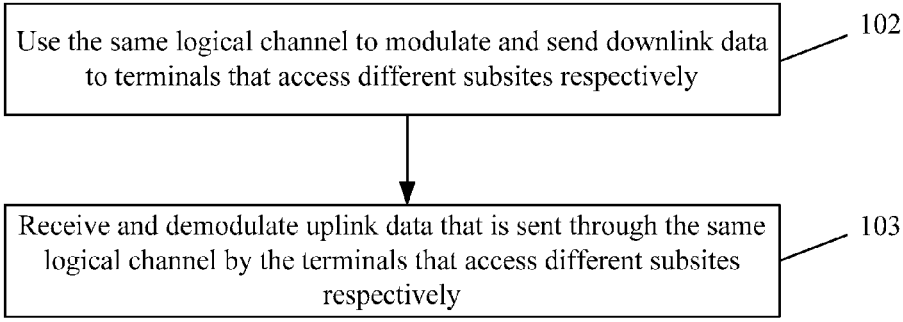
FIG. 2 is a flowchart of a communication method for a multi-site cell base station according to Embodiment 2 of the present invention.

With reference to all or part of the implementations of the foregoing embodiment, correspondingly, this embodiment provides a communication method for a multi-site cell base station. As shown in FIG. 2, the method specifically includes:

Step 202: Use a same logical channel to modulate and send downlink data to terminals that access different subsites respectively.

Specifically, the downlink data of the terminals that access different subsites respectively is encoded/encrypted and modulated simultaneously, and is sent through the same logical channel to the terminals that access different subsites respectively. In this way, the terminals, which access different subsites respectively, receive the downlink data from the base station through the same logical channel.

Step 203: Receive and demodulate uplink data that is sent through the same logical channel by the terminals that access different subsites respectively.

Specifically, the uplink data sent by the terminals that access different subsites respectively is received through the same logical channel. Because the subsite accessed by a terminal is independent, the uplink data sent by the terminals in different subsites may be demodulated independently on the same logical channel, and then decoded. In this way, the terminals, which access different subsites respectively, send the uplink data to the base station through the same logical channel.

It should be noted that no logical order is defined between step 202 and step 203.

Because the terminals that access different subsites use the same logical channel, compared with the prior art in which the terminals accessing different subsites occupy different logical channels, the embodiment reduces occupation of logical channels and increases cell capacity of a base station based on a multi-site cell technology.

Embodiment 3

Figure 3:
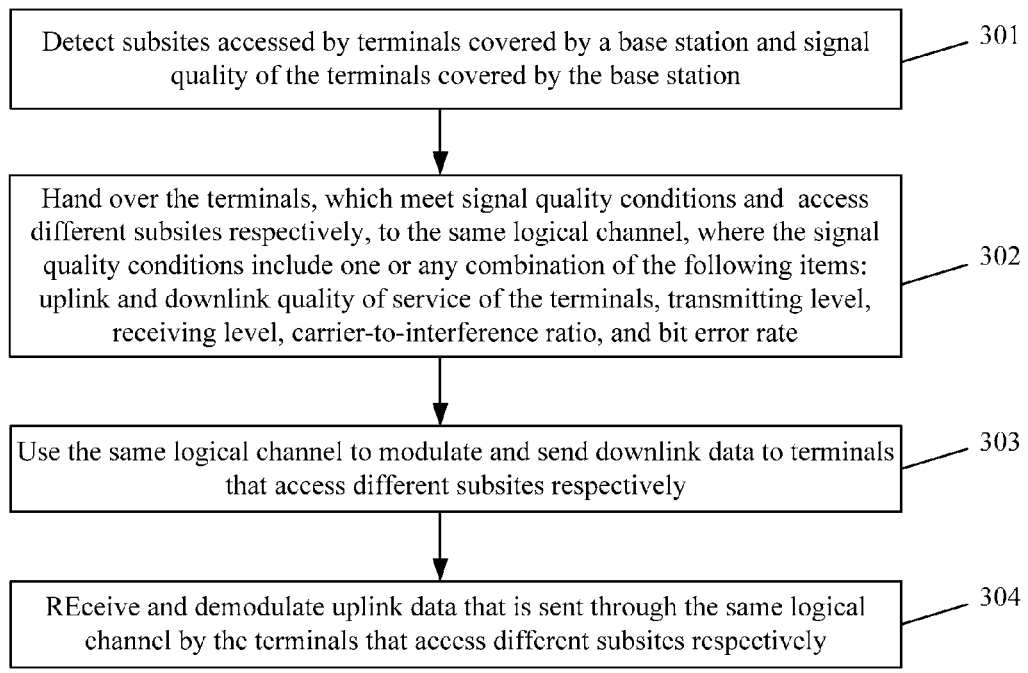
FIG. 3 is a flowchart of communication between a multi-site cell base station and a mobile phone according to Embodiment 3 of the present invention.

With reference to all or part of the implementations of the foregoing embodiments, correspondingly, the following describes the multi-site cell communication method of the present invention in more detail by using a communication process between a multi-site cell base station and a mobile phone as an example. Multiple subsites exist under the multi-site cell base station. In this embodiment, it is assumed that the number of mobile phones is only 2. As shown in FIG. 3, the mobile phones serve as terminals, and the communication process specifically includes:

Step 301: Detect subsites accessed by terminals covered by a base station and signal quality of the terminals covered by the base station.

Specifically, the base station detects the subsites accessed by a first mobile phone and a second mobile phone covered by the multi-site cell base station, so as to determine whether the first mobile phone and the second mobile phone access different subsites respectively, and detect the signal quality of the first mobile phone and the second mobile phone.

Step 302: Hand over the terminals, which meet signal quality conditions and access different subsites respectively, to the same logical channel, where the signal quality conditions include one or any combination of the following items: uplink and downlink quality of service of the terminals, transmitting level, receiving level, carrier-to-interference ratio, and bit error rate.

Specifically, according to the detected subsites accessed by the first mobile phone and the second mobile phone and the detected signal quality of the first mobile phone and the second mobile phone, if it is determined that the first mobile phone and the second mobile phone access different subsites respectively and meet the signal quality conditions, the base station controller sends an intra-cell handover command to a first logical channel occupied by the first mobile phone, so as to notify the first mobile phone of being handed over to a second logical channel occupied by the second mobile phone. The signal quality conditions may include one or any combination of the following items: uplink and downlink quality of service of the mobile phone, transmitting level, receiving level, carrier-to-interference ratio, bit error rate, and so on. If it is determined, by taking all such conditions into consideration, that the signal quality of the first mobile phone and the second mobile phone is good, it is ensured that the signal quality may not be affected by the use of the same logical channel for the first mobile phone and the second mobile phone.

Step 303: Use a same logical channel to modulate and send downlink data to terminals that access different subsites respectively.

Specifically, the base station encodes/encrypts the downlink data of the first mobile phone and the second mobile phone simultaneously on the second logical channel, and jointly modulates the downlink data when the signal quality of the first mobile phone and the second mobile phone reaches a preset value. Specifically, by considering one or any combination of the following items: uplink and downlink quality of service of the first mobile phone and the second mobile phone, transmitting level, receiving level, carrier-to-interference ratio, bit error rate, and so on, where a preset value of the signal quality is different from the foregoing value that meets the signal quality conditions, if it is determined that the signal quality of the first mobile phone and the second mobile phone is good and may not be affected by joint modulation, joint modulation is applied. If the signal quality does not reach the preset value, the downlink data is modulated independently. Specifically, the joint modulation may be: using an adaptive quadrature phase shift keying (Adaptive Quadrature Phase Shift Keying, AQPSK) modulation mode to modulate two channels of downlink data of the first mobile phone and the second mobile phone together; the independent modulation is to modulate the downlink data of the first mobile phone and the second mobile phone separately, and use a second logical channel to send the two channels of downlink data to the first mobile phone and the second mobile phone that access different subsites respectively, so that both the first mobile phone and the second mobile phone may receive the downlink data sent by the base station.

Step 304: Receive and demodulate uplink data that is sent through the same logical channel by the terminals that access different subsites respectively.

Specifically, the uplink data sent by the first mobile phone and the second mobile phone is received through the second logical channel. Because the two different subsites accessed by the first mobile phone and the second mobile phone are independent, the uplink data sent by the first mobile phone and the second mobile phone is demodulated independently on the second logical channel, and then decoded. In this way, both the first mobile phone and the second mobile phone, which access different subsites respectively, send the uplink data to the base station through the second logical channel.

It should be noted that no logical order is defined between step 303 and step 304.

The first mobile phone and the second mobile phone that access different subsites use the second logical channel to communicate with the base station. Compared with the prior art in which the first mobile phone and the second mobile phone, which access different subsites, occupy a first logical channel and a second logical channel, respectively, the embodiment reduces occupation of the first logical channel, makes an unoccupied first logical channel available to other mobile phones for communication, and increases cell capacity of a base station based on a multi-site cell technology. Moreover, according to the signal quality conditions of the mobile phones, whether to allow the first mobile phone and the second mobile phone to use the same logical channel is decided, thereby increasing the cell capacity of the base station based on a multi-site cell technology while ensuring the signal quality of the mobile phones.

It should be noted that in the embodiment, the base station may detect the subsite accessed by each mobile phone in the entire cell and the signal quality of the mobile phone, and hand over more than two mobile phones, which access different subsites respectively and meet the signal quality conditions, to the same logical channel. In this case, joint modulation of two channels of downlink data may be combined with independent modulation of one channel of downlink data. For example, if three channels of downlink data of three mobile phones need to be modulated, two channels of the downlink data are modulated in an AQPSK modulation mode, and the remaining channel of downlink data is modulated independently, thereby reducing occupation of the logical channels and increasing cell capacity of a base station based on a multi-site cell technology.

Embodiment 4

Figure 4:
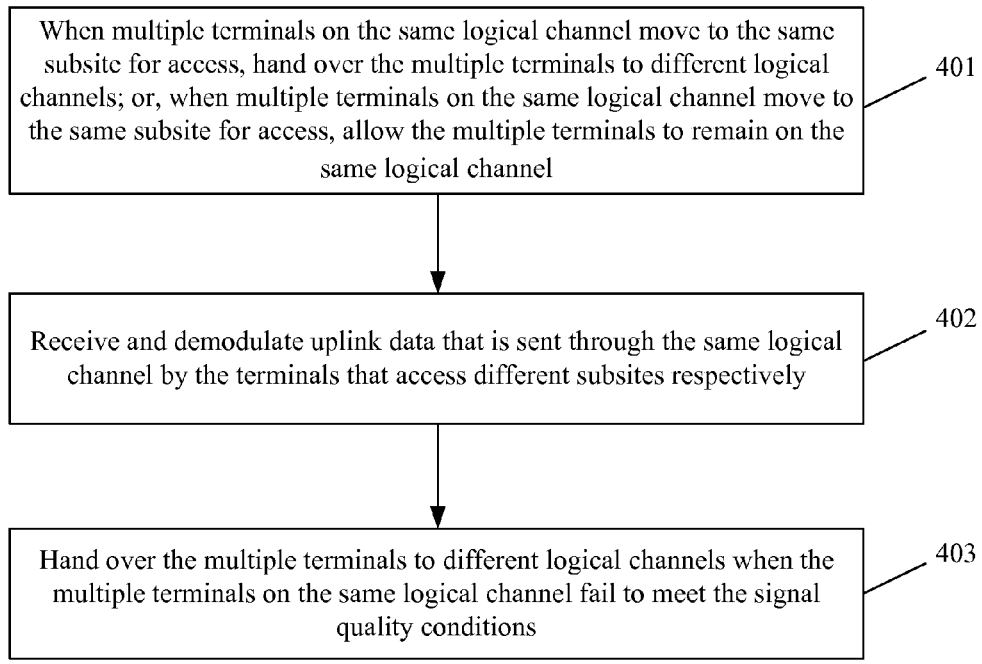
FIG. 4 is a flowchart of communication between a multi-site cell base station and a mobile phone according to Embodiment 4 of the present invention.

As shown in FIG. 4, the following further describes a multi-site cell communication method of the present invention on the basis of Embodiment 3. In the multi-site cell communication method provided in the embodiment, after a first mobile phone is handed over to a second logical channel occupied by a second mobile phone, the method further includes:

Step 401: When multiple terminals on the same logical channel move to the same subsite for access, hand over the multiple terminals to different logical channels; or, when multiple terminals on the same logical channel move to the same subsite for access, allow the multiple terminals to remain on the same logical channel.

Specifically, the base station may keep detecting the subsites accessed by the first mobile phone and the second mobile phone. When the first mobile phone and the second mobile phone move to the same subsite, the base station controller may hand over the first mobile phone to another logical channel to ensure no impact on the signal quality of the first mobile phone and the second mobile phone. Alternatively, without handing over the first mobile phone to another logical channel, the base station may use the second logical channel to send downlink data to the first mobile phone and the second mobile phone that access the same subsite.

Step 402: Receive and demodulate uplink data that is sent through the same logical channel by the terminals that access different subsites respectively.

Specifically, when the first mobile phone and the second mobile phone, which are on the second logical channel, move to the same subsite for access and both the first mobile phone and the second mobile phone occupy the second logical channel without being handed over to another logical channel, the base station may keep detecting the signal quality of the first mobile phone and the second mobile phone, and jointly demodulate or independently demodulate the uplink data of the first mobile phone and the second mobile phone according to the signal quality. If the signal quality of the first mobile phone and the second mobile phone reaches a preset value, the base station jointly demodulates the uplink data sent by the first mobile phone and the second mobile phone; if the signal quality of the first mobile phone and the second mobile phone does not reach the preset value, the base station independently demodulates the uplink data sent by the first mobile phone and the second mobile phone.

Step 403: Hand over multiple terminals to different logical channels when the multiple terminals on the same logical channel fail to meet the signal quality conditions.

Specifically, when the first mobile phone and the second mobile phone fail to meet the signal quality conditions, the base station controller may hand over the first mobile phone and the second mobile phone to different logical channels, for example, hand over the first mobile phone to another logical channel, so as to ensure no impact on the signal quality of the first mobile phone and the second mobile phone.

The first mobile phone and the second mobile phone that access different subsites use the second logical channel to communicate with the base station. Compared with the prior art in which the first mobile phone and the second mobile phone, which access different subsites, occupy a first logical channel and a second logical channel, respectively, the embodiment reduces occupation of the first logical channel, makes the unoccupied first logical channel available to other mobile phones for communication, and increases cell capacity of a base station based on a multi-site cell technology. Moreover, according to the signal quality conditions of the mobile phones, whether to allow the first mobile phone and the second mobile phone to use the same logical channel is decided, thereby increasing the cell capacity of the base station based on a multi-site cell technology while ensuring the signal quality of the mobile phones.

Embodiment 5

Figure 5:
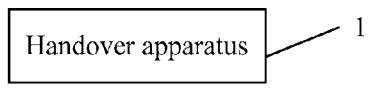
FIG. 5 is a structural block diagram of a base station controller according to Embodiment 5 of the present invention.

Based on the foregoing multi-site cell communication method, with reference to all or part of the implementations of the foregoing embodiments, correspondingly, the embodiment of the present invention further provides a base station controller for implementing a multi-site cell. As shown in FIG. 5, the base station controller includes:

a handover apparatus 1, configured to hand over terminals, which access different subsites respectively, to a same logical channel when the terminals, which access different subsites respectively, occupy different logical channels, where the detailed communication method may be the same as that of the foregoing embodiment, and is not repeated here.

In the entire cell of a base station based on a multi-site cell technology, once a logical channel is occupied, the logical channel is unavailable to all terminals in other subsites under the entire cell. The handover apparatus hands over the terminals in different subsites to the same logical channel so that logical channels are saved and available to other terminals, thereby increasing cell capacity of a base station based on a multi-site cell technology.

The handover apparatus 1 may be specifically configured to: hand over the terminals, which meet signal quality conditions and access different subsites respectively, to the same logical channel, where the signal quality conditions include one or any combination of the following items: uplink and downlink quality of service of the terminals, transmitting level, receiving level, carrier-to-interference ratio, and bit error rate.

Specifically, when it is determined that the multiple terminals access different subsites respectively and meet the signal quality conditions, the handover apparatus 1 hands over the multiple terminals to the same logical channel. The signal quality conditions may include one or any combination of the following items: uplink and downlink quality of service of the terminals, transmitting level, receiving level, carrier-to-interference ratio, bit error rate, and so on. If it is determined, by taking all such conditions into consideration, that the signal quality of the multiple terminals is good, it is ensured that the signal quality may not be further affected by the use of the same logical channel for the multiple terminals.

The handover apparatus 1 may be further configured to: when the multiple terminals on the same logical channel move to the same subsite for access, hand over the multiple terminals to different logical channels to ensure no impact on the signal quality of each terminal; or, allow the multiple terminals to remain on the same logical channel when the multiple terminals on the same logical channel move to the same subsite for access.

The handover apparatus 1 may be further configured to: after the multiple terminals that access different subsites respectively are handed over to the same logical channel, when the multiple terminals on the same logical channel fail to meet the signal quality conditions, hand over the multiple terminals to different logical channels to ensure no impact on the signal quality of the multiple terminals.

The detailed communication method may be the same as that of the foregoing embodiment, and is not repeated here.

Because the terminals that access different subsites use the same logical channel, compared with the prior art in which the terminals accessing different subsites occupy different logical channels, the embodiment reduces occupation of logical channels and increases cell capacity of a base station based on a multi-site cell technology.

Embodiment 6

Figure 6:
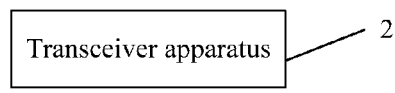
FIG. 6 is a structural block diagram of a base station according to Embodiment 6 of the present invention.

Based on the foregoing multi-site cell communication method and the base station controller provided in Embodiment 5, with reference to all or part of the implementations of the foregoing embodiments, correspondingly, the embodiment of the present invention provides a base station for implementing a multi-site cell. As shown in FIG. 6, the base station includes:

a transceiver apparatus 2, configured to use a same logical channel to modulate and send downlink data to terminals that access different subsites respectively, and/or receive and demodulate uplink data that is sent through the same logical channel by the terminals that access different subsites respectively.

The transceiver apparatus allows the terminals in different subsites to use the same logical channel to transmit data, thereby saving logical channels for other terminals and increasing cell capacity of a base station based on a multi-site cell technology.

Figure 7:
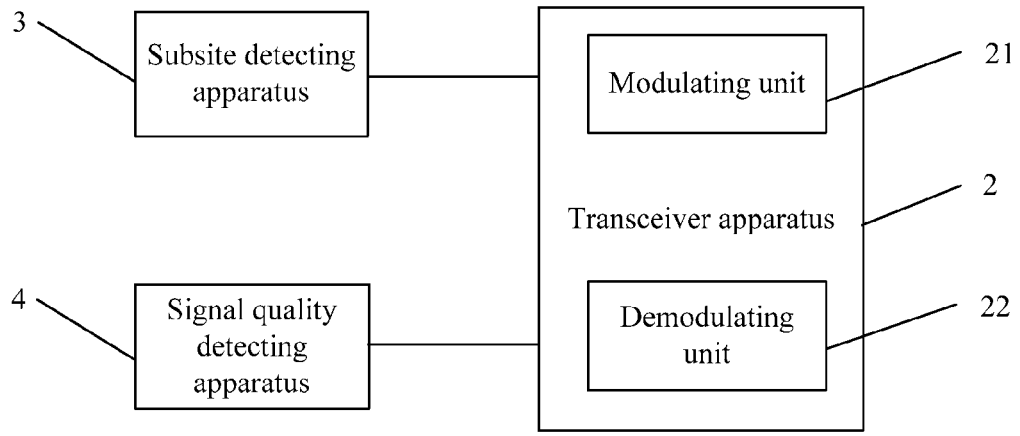
FIG. 7 is another structural block diagram of a base station according to Embodiment 6 of the present invention.

Further, as shown in FIG. 7, the base station further includes:

a subsite detecting apparatus 3, configured to detect subsites accessed by terminals covered by the base station, so as to determine whether the terminals access different subsites respectively; and a signal quality detecting apparatus 4, configured to detect signal quality of the terminals covered by the base station.

The transceiver apparatus 2 includes a modulating unit 21, configured to jointly modulate downlink data when the signal quality of the terminals reaches a preset value, or independently modulate the downlink data when the signal quality of the terminals fails to reach the preset value.

Specifically, the modulating unit jointly modulates the downlink data if it is determined that the signal quality of the multiple terminals detected by the signal quality detecting apparatus 4 reaches the preset value. Specifically, by considering one or any combination of the following items: uplink and downlink quality of service of the terminals, transmitting level, receiving level, carrier-to-interference ratio, bit error rate, and so on, if it is determined that the signal quality of the multiple terminals is good and that joint modulation may not affect the signal quality of the multiple terminals, a joint modulation mode is applied. If the signal quality of the multiple terminals fails to reach the preset value, the downlink data is modulated independently.

The transceiver apparatus 2 may further include a demodulating unit 22, configured to: jointly demodulate uplink data sent by the multiple terminals if it is determined, according to the subsite detecting apparatus 3 and the signal quality detecting apparatus 4, that the signal quality of the multiple terminals reaches a preset value when the multiple terminals on the same logical channel move to the same subsite for access and the multiple terminals remain on the same logical channel; and if the signal quality of the multiple terminals fails to reach the preset value, independently demodulate the uplink data sent by the multiple terminals.

Because the terminals that access different subsites use the same logical channel, compared with the prior art in which the terminals accessing different subsites occupy different logical channels, the embodiment reduces occupation of logical channels and increases cell capacity of a base station based on a multi-site cell technology.

It should be noted that the handover of the terminals to the same logical channel in the embodiment may be: handing over the terminals to the same logical channel of the same type, or directly assigning the terminal to the same logical channel of a different type.

Embodiment 7

Figure 8:
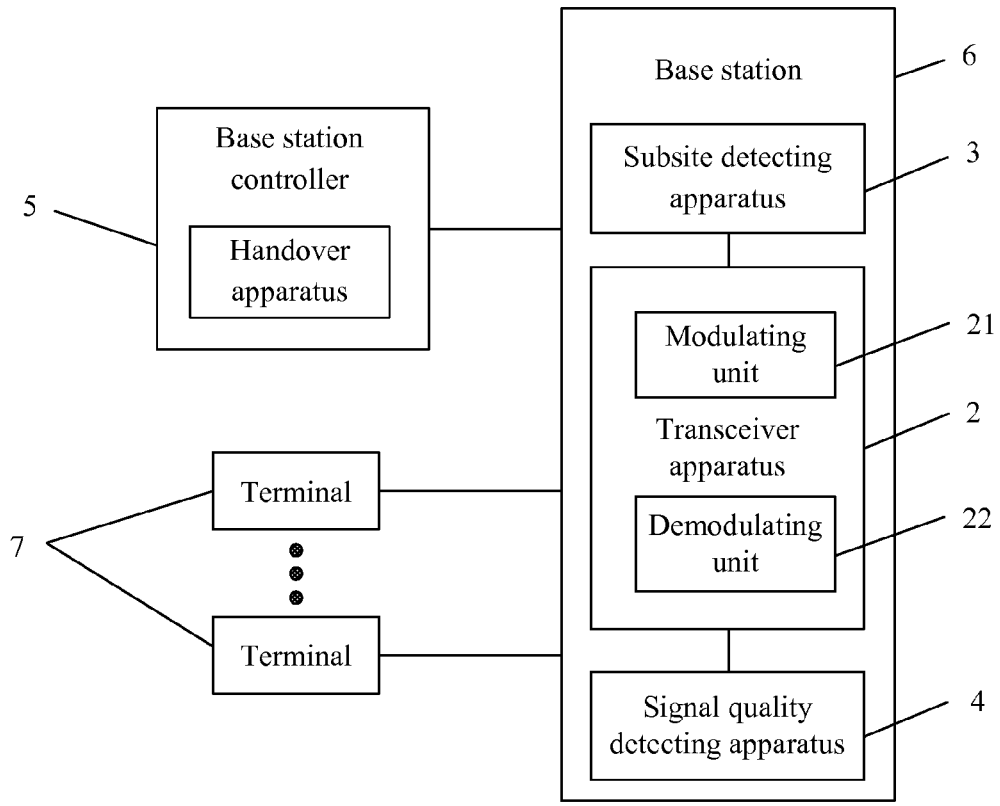
FIG. 8 is a structural block diagram of a communication system according to Embodiment 7 of the present invention.

Based on the base station controller and the base station for implementing a multi-site cell in the foregoing embodiments, with reference to all or part of the implementations of the foregoing embodiments, correspondingly, this embodiment provides a communication system for implementing a multi-site cell. As shown in FIG. 8, the communication system includes a base station controller 5 and/or a base station 6 and/or terminals 7 that are described above. Their detailed working principles and communication method may be the same as those in the foregoing embodiments, and are not repeated here.

Compared with the prior art in which the terminals accessing different subsites occupy different logical channels, the embodiment allows the terminals that access different subsites to use the same logical channel, thereby reducing occupation of logical channels and increasing cell capacity of a base station based on a multi-site cell technology.

With reference to all or part of the implementations of the foregoing embodiments, correspondingly, the present invention further provides the following embodiments:

1. A multi-site cell communication method, including: handing over terminals, which access different subsites respectively, to a same logical channel when the terminals, which access different subsites respectively, occupy different logical channels.

2. The multi-site cell communication method according to 1, where the handing over terminals, which access different subsites respectively, to a same logical channel specifically is: handing over the terminals, which meet signal quality conditions and access different subsites respectively, to the same logical channel, where the signal quality conditions include one or any combination of the following items: uplink and downlink quality of service of the terminals, transmitting level, receiving level, carrier-to-interference ratio, and bit error rate.

3. The multi-site cell communication method according to 1 or 2, further including: when multiple terminals on the same logical channel move to a same subsite for access, handing over the multiple terminals to different logical channels; or, when multiple terminals on the same logical channel move to a same subsite for access, allowing the multiple terminals to remain on the same logical channel.

4. The method according to 1 or 2 or 3, further including: handing over the multiple terminals to different logical channels when the multiple terminals on the same logical channel fail to meet the signal quality conditions.

5. A multi-site cell communication method, including: using a same logical channel to modulate and send downlink data to terminals that access different subsites respectively; and/or
receiving and demodulating uplink data that is sent through the same logical channel by the terminals that access different subsites respectively.

6. The method according to 5, where before using the same logical channel to modulate and send the downlink data to the terminals that access different subsites respectively, and/or receiving and demodulating the uplink data that is sent through the same logical channel by the terminals that access different subsites respectively, the method further includes:
detecting subsites accessed by the terminals covered by a base station.

7. The method according to 6, where before using the same logical channel to modulate and send the downlink data to the terminals that access different subsites respectively, and/or receiving and demodulating the uplink data that is sent through the same logical channel by the terminals that access different subsites respectively, the method further includes:
detecting signal quality of the terminals covered by the base station.

8. The method according to 7, where the process of using the same logical channel to modulate and send the downlink data to the terminals that access different subsites respectively includes:
jointly modulating the downlink data when the signal quality of the terminals reaches a preset value, or independently modulating the downlink data when the signal quality of the terminals fails to reach the preset value.

9. The method according to 8, where the process of receiving and demodulating the uplink data that is sent through the same logical channel by the terminals that access different subsites respectively includes:
jointly demodulating the uplink data sent by the multiple terminals if signal quality of the multiple terminals reaches a preset value when the multiple terminals on the same logical channel move to a same subsite for access and the multiple terminals remain on the same logical channel; and independently demodulating the uplink data sent by the multiple terminals if the signal quality of the multiple terminals fails to reach the preset value.

10. A base station controller for implementing a multi-site cell, including a handover apparatus, configured to hand over terminals, which access different subsites respectively, to a same logical channel when the terminals, which access different subsites respectively, occupy different logical channels.

11. The base station controller according to 10, where the handover apparatus is specifically configured to hand over the terminals, which meet signal quality conditions and access different subsites respectively, to the same logical channel, where the signal quality conditions include one or any combination of the following items: uplink and downlink quality of service of the terminals, transmitting level, receiving level, carrier-to-interference ratio, and bit error rate.

12. The base station controller according to 10 or 11, where:
the handover apparatus is further configured to hand over multiple terminals to different logical channels when the multiple terminals on the same logical channel move to a same subsite for access;
or
allow the multiple terminals to remain on the same logical channel when the multiple terminals on the same logical channel move to a same subsite for access.

13. The base station controller according to 10 or 11 or 12, where the handover apparatus is further configured to hand over the multiple terminals to different logical channels when the multiple terminals on the same logical channel fail to meet the signal quality conditions.

14. A base station for implementing a multi-site cell, including a transceiver apparatus, configured to use a same logical channel to modulate and send downlink data to terminals that access different subsites respectively, and/or receive and demodulate uplink data that is sent through the same logical channel by the terminals that access different subsites respectively.

15. The base station according to 14, further including a subsite detecting apparatus, configured to detect subsites accessed by the terminals covered by the base station.

16. The base station according to 15, further including a signal quality detecting apparatus, configured to detect signal quality of the terminals covered by the base station.

17. The base station according to 16, where the transceiver apparatus is specifically configured to jointly modulate the downlink data when the signal quality of the terminals reaches a preset value, or independently modulate the downlink data when the signal quality of the terminals fails to reach the preset value.

18. The base station according to 17, where:
the transceiver apparatus is specifically configured to: when multiple terminals on the same logical channel move to a same subsite for access, and the multiple terminals remain on the same logical channel,
jointly demodulate the uplink data sent by the multiple terminals if signal quality of the multiple terminals reaches a preset value; and
independently demodulate the uplink data sent by the multiple terminals if the signal quality of the multiple terminals fails to reach the preset value.

19. A communication system for implementing a multi-site cell, including the base station controller specified in any one of 10 to 13, and/or the base station specified in any one of 14 to 18, and/or terminals.

Through the foregoing description of the embodiments, it is clear to persons skilled in the art that the present invention may be implemented by software plus necessary general hardware, and definitely may also be implemented by hardware, but in many cases, the software implementation is preferred. Based on such an understanding, the technical solutions of the present invention essentially, or the part contributing to the prior art may be implemented in the form of a software product. The computer software product is stored in a readable storage medium, for example, a floppy disk, hard disk, or optical disk of the computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A multi-site cell communication method, comprising:
handing over terminals, which access different subsites respectively, to a same logical channel, when the terminals occupy different logical channels; and
performing at least one of the following:
(a) jointly modulating downlink data when a signal quality of the terminals reaches a preset value, and
(b) independently modulating the downlink data when the signal quality of the terminals fails to reach a preset value.

2. The method according to claim 1, further comprising:
handing over the terminals, which meet signal quality conditions and access the different subsites respectively, to the same logical channel, wherein the signal quality conditions comprise one or any combination of the following items: uplink and downlink quality of service of the terminals, a transmitting level, a receiving level, a carrier-to-interference ratio, and a bit error rate.

3. The method according to claim 2, further comprising:
when multiple terminals on the same logical channel move to a same subsite for access, handing over the multiple terminals to the different logical channels.

4. A multi-site cell communication method, comprising;
detecting subsites accessed by terminals covered by a base station;
detecting signal quality of the terminals covered by the base station; and
performing at least one of the following:
(a) using a same logical channel to modulate and send downlink data to the terminals that access different subsites respectively, wherein the process of using the same logical channel comprises jointly modulating the downlink data if the signal of the terminals reaches a preset value; and
(b) receiving and demodulating uplink data that is sent through the same logical channel by the terminals that access the different subsites respectively.

5. The method according to claim 4, wherein the process of receiving and demodulating the uplink data comprises:
jointly demodulating the uplink data sent by the terminals if the signal quality of the terminals reaches the preset value, when the terminals on the same logical channel move to a same subsite for access and the terminals remain on the same logical channel; and independently demodulating the uplink data sent by the multiple terminals if the signal quality of the multiple terminals fails to reach the preset value.

6. A base station controller for implementing a multi-site cell, comprising:
a handover apparatus, configured to:
hand over terminals, which access different subsites respectively, to a same logical channel, when the terminals occupy different logical channels, and
perform at least one of the following:
(a) jointly modulate downlink data when a signal quality of the terminals reaches a preset value, and
(b) independently modulate the downlink data when the signal quality of the terminals fails to reach a preset value.

7. The base station controller according to claim 6, wherein:
the handover apparatus is further configured to hand over the terminals, which meet signal quality conditions and access the different subsites respectively, to the same logical channel, wherein the signal quality conditions comprise one or any combination of the following items: uplink and downlink quality of service of the terminals, a transmitting level, a receiving level, a carrier-to-interference ratio, and a bit error rate.

8. The base station controller according to claim 7, wherein:
the handover apparatus is further configured to hand over multiple terminals to different logical channels when the multiple terminals on the same logical channel move to a same subsite for access;
or
allow the multiple terminals to remain on the same logical channel when the multiple terminals on the same logical channel move to a same subsite for access.

9. A base station for implementing a multi-site cell, comprising:
a subsite detecting apparatus, configured to detect subsites accessed by terminals covered by the base station;
a signal quality detecting apparatus, configured to detect signal quality of the terminals covered by the base station; and
a transceiver apparatus, configured to:
jointly modulate the downlink data when the signal quality of the terminals reaches a preset value, or independently modulate the downlink data when the signal quality of the terminals fails to reach a preset value, and implement at least one of the following:
- (a) use a same logical channel to modulate and send downlink data to the terminals that access different subsites respectively, and
- (b) receive and demodulate uplink data that is sent through the same logical channel by the terminals that access different subsites respectively.

10. The base station according to claim 9, wherein when multiple terminals on the same logical channel move to a same subsite for access, and the multiple terminals remain on the same logical channel, the transceiver apparatus is further configured to:

jointly demodulate the uplink data sent by the multiple terminals if signal quality of the multiple terminals reaches a preset value; and independently demodulate the uplink data sent by the multiple terminals if the signal quality of the multiple terminals fails to reach the preset value.

11. The method according to claim 2, further comprising:
when multiple terminals on the same logical channel move to a same subsite for access, allowing the multiple terminals to remain on the same logical channel.

12. The method according to claim 4, wherein the process of using the same logical channel further comprises:
independently modulating the downlink data if the signal quality of the terminals fails to reach a preset value.

* * * * *